US009513926B2

(12) United States Patent
Snyder, II et al.

(10) Patent No.: US 9,513,926 B2
(45) Date of Patent: Dec. 6, 2016

(54) FLOATING MASK GENERATION FOR NETWORK PACKET FLOW

(71) Applicant: Cavium, Inc., San Jose, CA (US)

(72) Inventors: Wilson Parkhurst Snyder, II, Holliston, MA (US); Nicholas New Jamba, Lancaster, MA (US)

(73) Assignee: Cavium, Inc., San Jose, CA (US)

( * ) Notice: Subject to any disclaimer, the term of this patent is extended or adjusted under 35 U.S.C. 154(b) by 288 days.

(21) Appl. No.: 14/150,664

(22) Filed: Jan. 8, 2014

(65) Prior Publication Data
US 2015/0195388 A1 Jul. 9, 2015

(51) Int. Cl.
*H04L 29/06* (2006.01)
*H04L 12/741* (2013.01)
*H04L 12/861* (2013.01)
*H04L 12/879* (2013.01)
*G06F 9/38* (2006.01)
*G06F 7/76* (2006.01)
*G06F 17/27* (2006.01)

(52) U.S. Cl.
CPC ............. *G06F 9/3887* (2013.01); *G06F 7/764* (2013.01); *G06F 17/2705* (2013.01); *H04L 69/00* (2013.01)

(58) Field of Classification Search
CPC ...... H04L 69/22; H04L 45/745; H04L 49/901; H04L 49/9057; G06F 17/27–17/279; G06F 7/764; G06F 7/76
USPC .................... 370/392, 474; 707/755; 712/224
See application file for complete search history.

(56) References Cited

U.S. PATENT DOCUMENTS

| 5,832,288 | A | * | 11/1998 | Wong | G06F 9/30018 |
| | | | | | 712/5 |
| 6,038,378 | A | * | 3/2000 | Kita | G06F 11/3684 |
| | | | | | 714/38.11 |
| 6,453,360 | B1 | * | 9/2002 | Muller | H04L 29/06 |
| | | | | | 370/235 |
| 7,187,694 | B1 | * | 3/2007 | Liao | H04L 69/12 |
| | | | | | 370/474 |
| 8,161,270 | B1 | * | 4/2012 | Parker | G06F 9/30018 |
| | | | | | 712/223 |
| 9,270,517 | B1 | * | 2/2016 | Attig | H04L 69/22 |
| 2003/0108038 | A1 | * | 6/2003 | Devanagondi | H04L 49/90 |
| | | | | | 370/389 |
| 2003/0174711 | A1 | * | 9/2003 | Shankar | H04L 45/742 |
| | | | | | 370/395.53 |

(Continued)

Primary Examiner — Mark Rinehart
Assistant Examiner — Kenneth P Hunt
(74) Attorney, Agent, or Firm — pkalousek.ip

(57) ABSTRACT

A tag mask generation method comprises receiving a section_selector flag indicating whether a tag mask for a section of a network packet is to be generated; receiving from a parser a parse information for the network packet, wherein the parse information includes a section_pointer that indicates a location of the section in the network packet; generating a pointer based on the section_pointer when the section_selector indicates that the tag mask for the section is to be generated; receiving a base mask for the section; and generating the tag mask via a shifter by shifting the base mask by the amount indicated by the pointer. The parse information may further include a section_pointer_valid flag indicating whether the section is included in the network packet, and the method may further comprise including the tag mask in a combined tag mask when the section_pointer_valid flag indicates that the section is included in the network packet.

23 Claims, 3 Drawing Sheets

(56) References Cited

U.S. PATENT DOCUMENTS

| | | | |
|---|---|---|---|
| 2007/0110224 A1* | 5/2007 | Gumpel | G06F 21/6245 380/28 |
| 2008/0077643 A1* | 3/2008 | Handa | G06F 7/764 708/209 |
| 2008/0151935 A1* | 6/2008 | Sarkinen | H04Q 11/04 370/469 |
| 2012/0117610 A1* | 5/2012 | Pandya | H04L 63/0485 726/1 |
| 2013/0114599 A1* | 5/2013 | Arad | H04L 49/358 370/392 |
| 2013/0212354 A1* | 8/2013 | Mimar | G06F 9/30021 712/4 |
| 2015/0124840 A1* | 5/2015 | Bergeron | H04L 69/161 370/476 |

* cited by examiner

FLOATING MASK GENERATION FOR NETWORK PACKET FLOW

RELATED APPLICATIONS

This application is related to the concurrently filed U.S. patent application Ser. No. 14/150,602 titled "Methods and Systems for Single Instruction Multiple Data Programmable Packet Parsers," and Ser. No. 14/150,657; "Methods and Systems for Flexible Packet Classification,". The entire contents of both applications are incorporated herein by reference.

TECHNICAL FIELD

The present disclosure relates generally to computer networks and in particular to methods and systems for generation of floating masks related to the flow of network packets.

BACKGROUND

Many electronic devices, such as computers, communicate via network packets. The network packets are usually sent from a source to a destination. During this journey the packet may pass through one or more intermediary recipients before reaching the final recipient, i.e., the destination. Different types of recipients include network processors, network switches, and network interfaces. Each recipient of the packet may need to parse the packet, that is, analyze the data in the packet to determine its characteristics. The characteristics of a network packet may include its source, destination, or type. The recipients utilize parsing mechanisms to perform the parsing. As part of the parsing, the recipient may split the bytes in the packet into its different network protocol layers and fields within those protocols, to enable further processing.

The number and complexity of network protocols are constantly growing. Previous parsing techniques lack the required flexibility and speed to handle this growth. To parse a new or an updated networking protocol, for example, these techniques may require updating their networking hardware or software. Otherwise, the systems may not be able to parse the new or updated protocol or may parse it at lower than desirable speeds.

SUMMARY

Some embodiments provide a tag mask generation method comprising receiving a section_selector flag indicating whether a tag mask for a section of a network packet is to be generated; receiving from a parser a parse information for the network packet, wherein the parse information includes a section_pointer that indicates a location of the section in the network packet; generating a pointer based on the section_pointer when the section_selector indicates that the tag mask for the section is to be generated; receiving a base mask for the section; and generating the tag mask via a shifter by shifting the base mask by the amount indicated by the pointer.

According to some embodiments, the parse information further includes a section_pointer_valid flag indicating whether the section is included in the network packet, and wherein the method further comprises including the tag mask in a combined tag mask when the section_pointer_valid flag indicates that the section is included in the network packet. According to some embodiments, including the tag mask in the combined tag mask includes combining the tag mask with the section_pointer_valid flag via an AND gate and including the result to the combined tag mask. According to some embodiments, the method further comprises applying the tag mask to the network packet to derive a masked packet. According to some embodiments, the tag mask is applied to the network packet via an AND gate. According to some embodiments, the method further comprises reducing the masked packet to derive a tag for the network packet. According to some embodiments, the method further comprises scheduling queuing or processing of the packet based on the tag.

According to some embodiments, the section is a first section of the network packet and the tag mask is a first tag mask corresponding to the first section, the method further comprising: generating a second tag mask corresponding to a second section of the network packet; and combining the first tag mask and the second tag mask to generate a combined tag mask. According to some embodiments, the first tag mask and the second tag mask are combined via an OR gate. According to some embodiments, the method further comprises applying the combined tag mask to the network packet to derive a masked packet. According to some embodiments, the method further comprises reducing the masked packet to derive a tag for the network packet. According to some embodiments, the method further comprises scheduling queuing or processing of the packet based on the tag.

Some embodiments provide a tag mask generation system comprising a selector module configured to generate a section_selector flag indicating whether a tag mask for a section of a network packet is to be generated; a multiplexer configured to receive the section_selector and a parse information for the network packet, wherein the parse information includes a section_pointer that indicates a location of the section in the network packet, and further configured to generate a pointer based on the section_pointer when the section_selector indicates that the tag mask for the section is to be generated; a shifter module configured to receive the pointer and a base mask for the section, and further configured to generate the tag mask by shifting the base mask by the amount indicated by the pointer.

According to some embodiments, the parse information further includes a section_pointer_valid flag indicating whether the section is included in the network packet, and wherein the system further comprises a combiner that is configured to include the tag mask in a combined tag mask when the section_pointer_valid flag indicates that the section is included in the network packet. According to some embodiments, including the tag mask in the combined tag mask includes combining the tag mask with the section_pointer_valid flag via an AND gate and including the result to the combined tag mask. According to some embodiments, the system further comprises a masked packet generator module configured to apply the tag mask to the network packet to derive a masked packet. According to some embodiments, the system further comprises a reducer module configured to reduce the masked packet to derive a tag for the network packet. According to some embodiments, the system further comprises a scheduling unit configured to schedule queuing or processing of the packet based on the tag. According to some embodiments, the section is a first section of the network packet and the tag mask is a first tag mask corresponding to the first section and generated by a first tag mask generator, the system further comprising a second tag mask generator configured to generate a second tag mask corresponding to a second section of the network packet; and a combiner module configured to combine the first tag mask and the second tag mask to generate a combined tag mask.

According to some embodiments, the system further comprises a masked packet generator configured to apply the combined tag mask to the network packet to derive a masked packet. According to some embodiments, the system further comprises a reducer module configured to reduce the masked packet to derive a tag for the network packet. According to some embodiments, the system further comprises a scheduling unit configured to schedule queuing or processing of the packet based on the tag.

Some embodiments provide a non-transitory computer readable medium storing a computer program that, when executed by a tag generation system, causes the tag generation system to perform the tag mask generation method.

BRIEF DESCRIPTION OF THE DRAWINGS

The drawings are not necessarily to scale or exhaustive. Instead, emphasis is generally placed upon illustrating the principles of the embodiments described herein. The accompanying drawings, which are incorporated in this specification, and constitute a part of it, illustrate several embodiments consistent with the disclosure. Together with the description, the drawings serve to explain the principles of the disclosure.

In the drawings.

DETAILED DESCRIPTION

Figure 1:
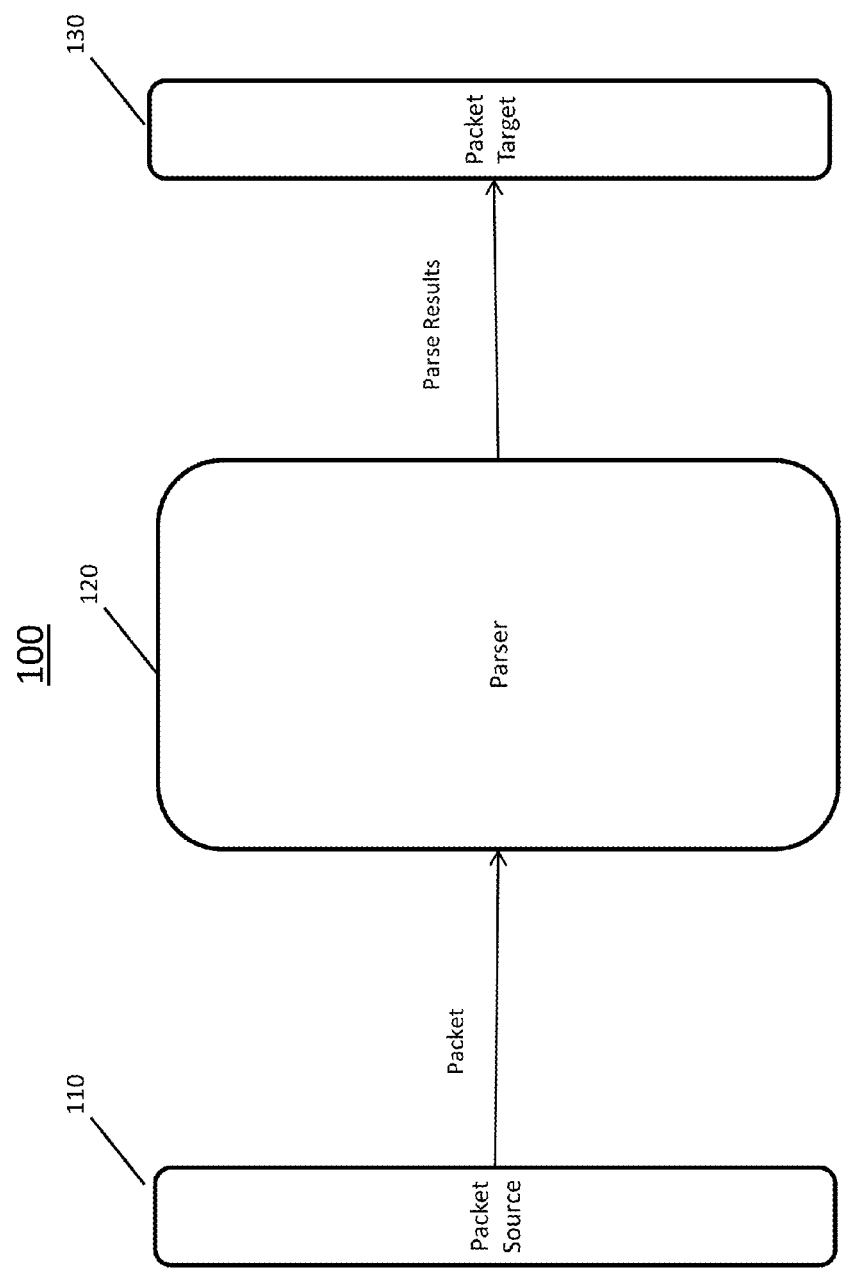
FIG. 1 is a block diagram of a packet parsing system according to some embodiments.

The following detailed description refers to the accompanying drawings. Wherever possible, the same or similar reference numbers are used in the drawings or in the description to refer to the same or similar parts. Also, similarly-named elements may perform similar functions and may be similarly designed, unless specified otherwise. Numerous details are set forth to provide an understanding of the described embodiments. The embodiments may be practiced without these details. In other instances, well-known methods, procedures, and components have not been described in detail to avoid obscuring the described embodiments.

While several exemplary embodiments and features are described here, modifications, adaptations, and other implementations may be possible, without departing from the spirit and scope of the invention. Accordingly, unless explicitly stated otherwise, the descriptions relate to one or more embodiments and should not be construed to limit the invention as a whole. This is true regardless of whether a reference is or is not explicitly made to state that a feature is relevant to "one or more," "some," or "various" embodiments. Instead, the proper scope of the invention is defined by the appended claims. Further, stating that a feature may exist indicates that the feature exists in one or more embodiments.

In this disclosure, the terms "include," "comprise," "contain," and "have," when used after a set or a system, mean an open inclusion and do not exclude addition of other, non-enumerated, members to the set or to the system.

Moreover, as used in this disclosure, a subset of a set can include one or more than one, including all, members of the set.

Various embodiments utilize novel patent parsing mechanisms that enable efficient handling of various network packet types. In various embodiments, a packet parsing system receives network packets, parses those packets, and delivers the parse results to one or more recipients (also called here targets). Unless stated otherwise, the terms network packet, packet, or packet data are used interchangeably to indicate network packets that are transmitted according to one or more network protocols. FIG. 1 is a block diagram of a packet parsing system 100 according to some embodiments. Packet parsing system 100 includes a packet source 110, a packet parser 120, and a packet 130.

Packet source 110 sends one or more packets to parser 120. Packet source 110 may include, for example, one or more packet transmitters such as one or more semiconductor systems that implement system 100, an Ethernet MAC, a network switch, a network processor, or a network interface of the one or more computers that implement system 100.

Parser 120 is a parsing system configured to parse the received packets and extracts from those packets some parse results. In some embodiments, the parse results include information related to one or more protocol layers and fields within those protocols according to which the packets are built. In some embodiments, parser 120 includes a plurality of parsing clusters. Each parsing cluster may include one or more parsing engines that are configured to parse received packets.

The parse results, for example, may include the type of the packet's protocol, whether one or more fields or layers of that protocol are present in the packet, the packet destination, or a subset of the information in the layers or fields that are present. In some embodiments, in addition to the above parse results, the parser also derives some other information such as style values or mask tags.

In various embodiments, packet target 130 includes one or more systems that receive from parser 120 the parse results and use those results in their operation. Packet target 130 may also receive a part or the entire parsed packet itself along with the parse results. Packet target 130 may include, for example, parts of one or more computers on which system 100 is installed, an Ethernet MAC, a DMA, a network switch, a network processor, or a network interface. The target may process the packets it receives in different orders. Processing the packets may include transmitting them to another recipient or to another layer in the same recipient.

In some embodiments, once a packet is parsed, it may further be classified into a specific flow class. The flow classes of different packets may indicate which packets should remain in the same queue or in what order, as they are sent to the recipient or further processed by the recipient. In some embodiments, the system determines the flow class of the packet by generating a tag for the packet. A tag may be a number created based on the data in the packet. Different packets with the same tag may be classified into the same flow class and queued together. Packets with the same tag may thus be processed in series. Having the same tag may indicate that the packets have the same information is a specific section, such as a part of one of their layers. Some embodiments generate a tag for a packet by extracting those specific sections of the packet. The extracted sections may be bits or bytes of the packet that are located at specific locations of specific protocol layers.

Some embodiments are able to generate a tag for a packet that includes a specific combination of some pre-determined protocols. Some of these embodiments use fixed programmatic logics or custom logics for generating the tag. Some embodiments generate a tag by hardcoding specific fields or a custom logic for optional inclusion in the tag based on the available protocols. For example, a bit would enable including the GRE call identifier if the parser has detected a GRE layer in the packet. Alternatively, a software routine may calculate the tag as each layer is parsed. In some embodiments, the networking hardware chip supports an arbitrary byte mask that does not float with the protocol layers. Some of these embodiments may not be able to generate a tag for a packet that includes a section that has a protocol type, location, or size other than for which the tag generator is designed.

Some other embodiments, on the other hand, provide flexibility and can process packets that include different protocol types, numbers, or sizes. These embodiments allow inclusion of arbitrary bits/bytes of a protocol layer into the tag calculation, irrespective of those differences. The selected bits/bytes may, for example, float as protocol header layers "above" the desired layer change size, or even when the number or types of the other protocols change. In other words, the tag generation system can extract the desired bits or bytes of the desired layer even when the location of the layer in the packet changes from one packet to another. Some embodiments of the tag generation system can generate the same type of tag for packets parsed by different engines of the same cluster. In some embodiments, the tags for different engines are of different types. The type of a tag may determine what type of data from what sections of each packet are extracted for generating the tag.

Figure 2:
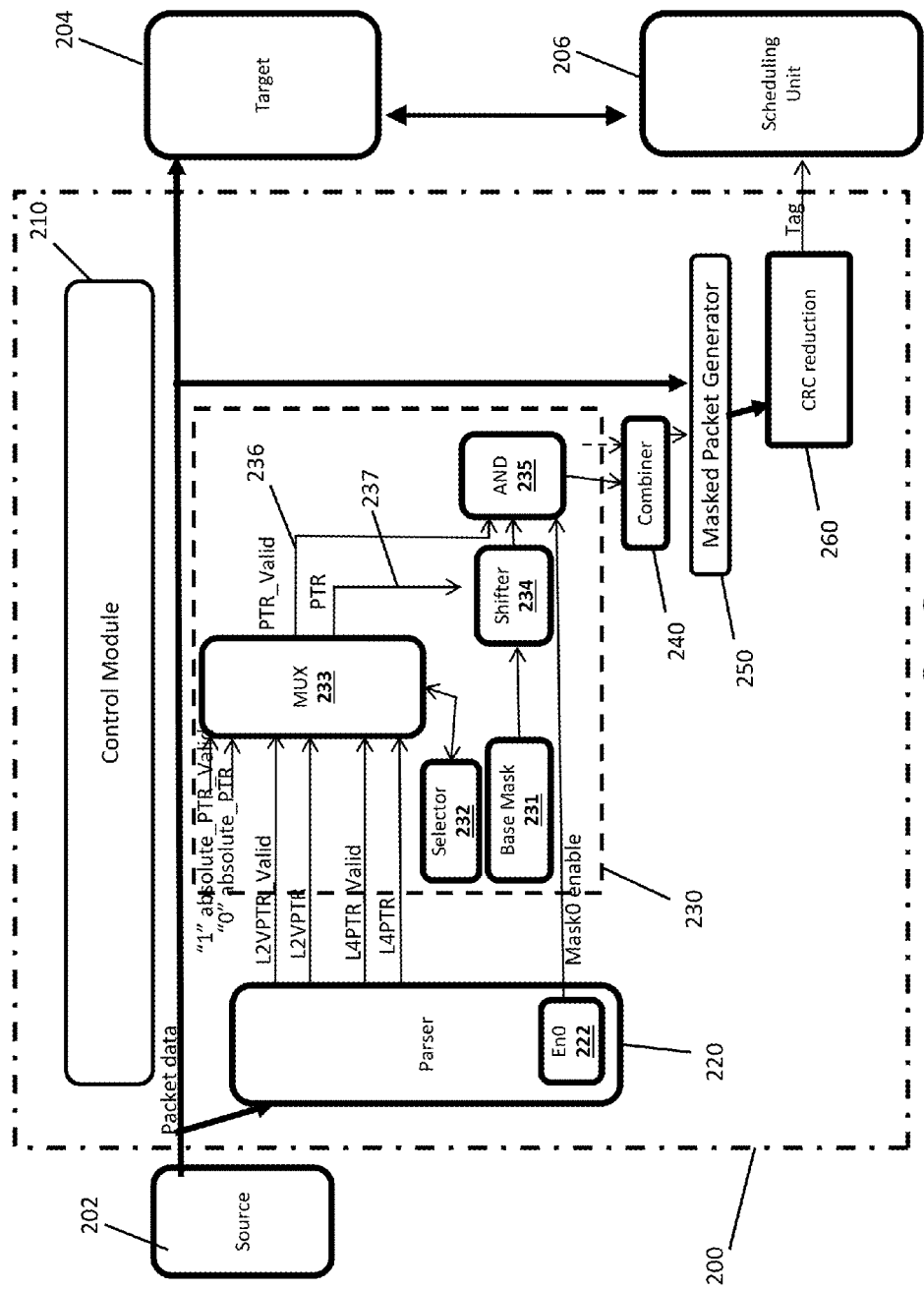
FIG. 2 is a block diagram for a tag generation system and method according to some embodiments.

FIG. 2 is a block diagram for a tag generation system and method according to some embodiments. In particular, FIG. 2 shows a tag generation system 200 along with packet source 202, packet target 204, and scheduling unit 206. Packet source 202 sends packet data to tag generation system 200. Tag generation system 200 generates a tag for the packet based on the packet data. Scheduling unit 206 receives from tag generation system 200 the tag for the packet and uses the tag to schedule processing of that packet, in relation to other packets. Target 204 receives packet data and other data from tag generation system, and scheduling information from scheduling unit 206, and further processes the data. In some embodiments, scheduling unit 206 is part of target 204.

Tag generation system 200 includes a control module 210, a parser 220, one or more tag mask generators 230, tag mask combiner module 240, masked packet generator 250, and CRC reduction module 260. In some embodiments, one or more of the above sections of the tag generation system are included in a parser.

Control module 210 may be configured to program the various memories and registers described herein. This programming includes specifying multiple tag masks used by the tag generation system. A tag mask may specify a specific packet section, such as the protocol layer, to which the mask applies. Further, a tag mask may specify a set of bits or bytes from that section that should be included in the tag. The tag mask may specify that set of bits or bytes by providing a mask that enables that set and blocks the remainder of bits or bytes. For example, in an embodiment, one tag mask may be designed to enable the GRE call identifier bytes of the packet, if the packet includes GRE information. GRE is an L4 protocol, and GRE call identifier includes bytes 16-20 of the GRE header bytes. The tag mask, thus, specifies L4 as its layer and further enables bytes 16-20 of that layer, as further illustrated below.

Parser 220 is configured to parse the received packet and generate parse results. The parse results may include information about whether one or more sections are present in the packet, and the location of the sections that are present. Parser 220 may also include a mask enabler 222. Mask enabler 222 may be configured to store one or more enable_flags indicating whether tag masks for one or more sections of the packet should be generated. Enabler 222 may determine the enable_flags based on the results of the parse. For example, if parse results indicate that the packet includes a GRE type layer 4 information, enabler 222 may turn on a flag for including the tag mask for the GRE call identifier. Alternatively, enabler 222 may turn on a flag based on the scheduling process or other characteristics of target 204. The enabler may, for example, turn on a flag for the GRE data if these data are required for generating the tag. In some embodiments, each enable_flag is a bit, and turning on the flag amounts to setting that bit to 1. In one embodiment, parser 220 generates final style information that includes a bitmask corresponding to enabled tag masks.

In some embodiments, one or more possible sections of a packet, such as protocol layer sections or subsections, are each associated with a corresponding tag mask. For example, tag mask 0 may apply to the VLAN layer. In some embodiments, enabler 222 may enable tag mask 0 for a packet if the parser recognizes a VLAN section in the packet.

Tag mask generators 230 are configured to receive from parser 220 some of the parse results for a packet and generate one or more tag masks for that packet. In some embodiments, each tag mask generator generates a tag mask for a specific section or subsection of the packet. For example, one tag mask generator 230 may generate a tag mask for the GRE call identifier subsection, while another tag mask generator 230 may generate a tag mask for a VLAN section.

In FIG. 2, a tag mask generator 230 includes a base mask module 231, a selector module 232, one or more multiplexers (MUXes) 233, shifter module 234, and an AND module 235. Base mask module 231 stores a base tag mask for the tag mask generator. The base tag mask has a sequence of bits or bytes that enable the bits or bytes corresponding to the specific tag mask generator. The enabling bits or bytes may be positioned with respect to a relative location of the bites or bytes in the corresponding section and not with respect to the absolute location of the bits or byte in a specific packet, as those absolute locations may vary from one packet to another. For example, a base tag mask for a GRE call identifier may enable bytes 9-12 of the GRE layer, as measured from the leftmost byte of that layer. The absolute location of those bytes in a packet, on the other hand, may depend on the number, types, or sizes of layers that precede the GRE layer in that packet.

In some embodiments, the length of a base tag mask is shorter than the full length of a packet. For example, a complex IPv6 packet may have a 192 byte header, while a base tag mask for that packet may be 32 bytes long.

Selector module 232 stores a selector flag. The selector flag for each tag mask generator 230 indicates whether the corresponding tag mask should be positioned relative to a specific section of the packet, such as a specific layer. For example, for a GRE tag mask generator, the selector flag may be an L4 relative flag, indicating that the bytes for the tag mask should be positioned with respect to the beginning of the L4 layer. Alternatively, the selector flag may be an absolute flag, indicating that the tag mask is absolute and should be positioned with respect to the start of the packet. In some embodiments, the selector flag is also stored in base tag mask module 231.

Multiplexer 233 receives input information that may include the selector flag received from selector module 232 and some parse results received from parser 220. Based on the input information, MUX 233 generates some output information as explained below. The parse results that MUX 233 receives may include one or more section_pointer_valid flags for one or more sections or subsections of the packet and one or more corresponding section_pointers.

Each section_pointer_valid flag indicates whether the parser found the corresponding section, such as a layer, in the packet. Each section_pointer, on the other hand, points to the absolute location of the corresponding section in the packet, as found by the parser. For example, as shown in FIG. 2, MUX 233 may receive an L2VPTR valid, an L2VPTR, an L4PTR Valid, and an L4PTR. The L2VPTR valid flag may indicate whether or not the parser found a layer 2 Ethernet 802.1Q VLAN section in the specific packet. Moreover, if the parser finds such a section, the L2VPTR pointer points to the absolute location first byte of this layer, that is, its location as measured from the start of the packet. Similarly, the L4PTR Valid flag indicates whether or not the parser found a layer 4 section, such as a GRE layer, in the packet, and, if found, the L4PTR pointer points to the absolute location of the first byte of this layer in the packet. In various embodiments, MUX 233 may receive the section_pointer_valid flags and the section_pointer pointers for other sections of the packet. In some embodiments, MUX 233 receives a section_pointer_valid flag or a section_pointer pointer through a channel from a parser. In some embodiments, this channel may be a hardware connection, such as a wire, from parser 220 to MUX 233.

The parse results that MUX 233 receives may also include an absolute_pointer_valid flag and an absolute_pointer. The absolute_pointer_valid flag may indicate whether an absolute tag mask can be utilized for the specific packet. Moreover, if this flag is valid, the absolute_pointer indicates the location of the packet with respect to which the absolute tag should be located. In some embodiments, the absolute_pointer points to the starting bit of the packet, i.e., to bit number 0.

Based on the input information, MUX 233 generates output information that includes a pointer_valid flag 236 and a pointer 237. Pointer 237 is a pointer to the location of the section of the packet that corresponds to the tag mask of the tag mask generator 230. For example, for a GRE tag mask, pointer 236 may be the L4PTR pointer, pointing to the starting location of the L4 layer in the specific packet for which the tag mask is being generated. Pointer_valid flag 236, on the other hand, indicates whether pointer 237 is a valid pointer and can be used. Pointer_valid flag 236 may, for example, be true if the parser has detected an L4 layer in the packet.

MUX 233 may use the selector flag to select one of the section_pointer_valid flags as pointer_valid flag 236. Moreover, MUX 233 may use the selector flag to select one of the section_pointers as pointer 237. These sections may correspond to the section or subsection indicated by the selector flag. For example, if the selector flag is an L4 relative flag, MUX 233 may select the L4PTR Valid as pointer_valid flag 236 and also select L4PTR as pointer 237. In some embodiments, if the selector flag is an absolute flag, MUX 233 selects the absolute_pointer_valid flag as pointer_valid flag 236, and further selects the absolute_pointer as pointer 237.

In some embodiments, MUX 233 includes two multiplexers, a pointer_valid multiplexer and a pointer multiplexer. The pointer_valid multiplexer may receive the one or more section_pointer_valid flags, the absolute_pointer_valid flag, and the selector flag; and generate pointer_valid flag 236. The pointer multiplexer, on the other hand, may receive the one or more section_pointers, the absolute_pointer, and the selector flag; and generate pointer 237.

Shifter module 234 receives pointer 237 and the base tag mask, and generates a shifted tag mask. In particular, shifter module 234 may generate the shifted tag mask by shifting the location of the base tag mask to the location to which pointer 237 points. Such a shifted tag mask aligns with the correct section of the parsed packet.

AND module 235 combines pointer_valid 237, the shifted tag mask, and the enable_flag received from enabler 222; and outputs a tag mask. In particular, AND module 235 may output the shifted tag mask as the tag mask, if pointer_valid 237 indicates that pointer 236 is valid and also the enable_flag indicates that the mask for the specific tag mask generator 230 is enabled. If these conditions are not satisfied, on the other hand, AND module 235 outputs a null tag. A null flag may indicate that no data should be selected from the packet data. In some embodiments, AND module 235 is an AND gate.

Combiner module 240 receives one or more tag masks from one or more tag mask generators 230 and generates a combined tag mask for the packet. Different tag mask generator 230 may generate tag masks that correspond to different sections of the parsed packet. The combined tag mask, on the other hand, is a mask that corresponds to a combination of those sections. In some embodiments, the combined tag mask includes a union of the masks of the one or more tag masks. Combiner module 240 may include an OR gate, which receives the one or more tag masks as inputs and generates the combined tag mask by applying an OR operation among the inputs.

Masked packet generator 250 receives the combined tag mask and the packet data, and generates a masked packet. The masked packet for the packet may result from applying the combined tag mask to the packet. The masked packet may include only those bits of the packet that are enabled by the combined tag mask In some embodiments, masked packet generator 250 includes an AND gate that applies the tag mask to the packet data by performing an AND operation between them.

CRC reduction module 260 receives the masked packet and generates a tag for the packet. In some embodiments, CRC reduction module 260 implements a fast hashing function. CRC reduction module 260 may implement, for example, a CRC16 or a CRC32 function.

Scheduling unit 206 uses the tag for the packet to schedule processing of that packet in relation to other packets. In some embodiments, in addition to the tag, scheduling unit 206 also receives an identifier of the packet to associate the tag with the packet. In some embodiments, scheduling unit 206 schedules packets with the same tag to be processed in the same sequence. Based on these data, packets are then queued or processed by target 204.

Figure 3:
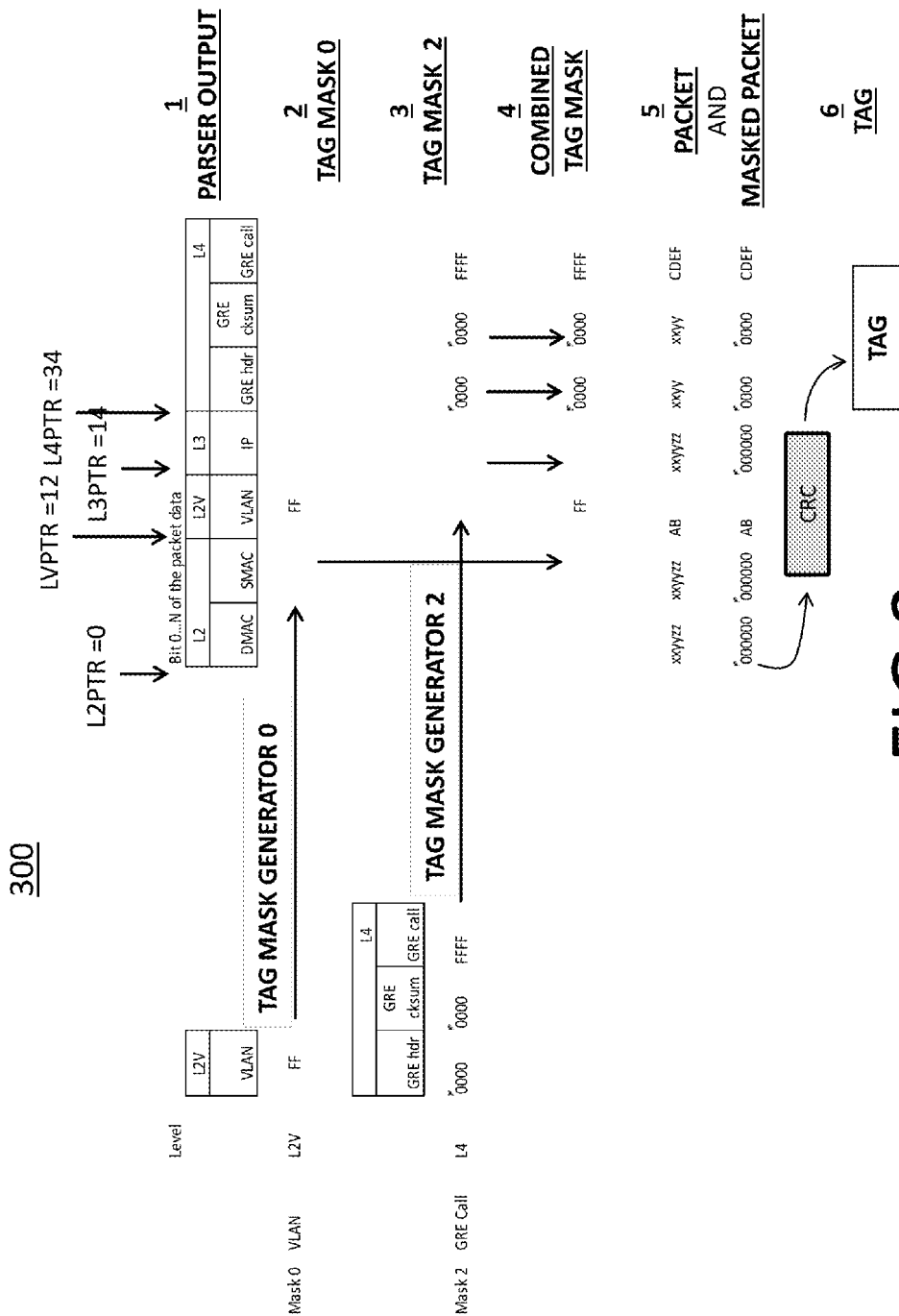
FIG. 3 shows an illustrative diagram outlining generation of a tag for a packet according to an embodiment.

FIG. 3 shows an illustrative diagram 300 outlining generation of a tag for a packet according to an embodiment. Diagram 300 depicts six stages for this generation. These stages show, from top to bottom, 1) some of the parser outputs as sent to the tag generation system, 2) generation of a first tag mask (tag mask 0) by a first tag mask generator (tag mask generator 0), 3) generation of a second tag mask (tag mask 2) by a second tag mask generator (tab mask generator 2), 4) generation of a combined tag mask, 5) generation of a masked packet data, and 6) generation of the tag.

The first stage shows some of the outputs that the parser derives from a packet and sends to the tag generation system. The shown parser outputs indicate that for the packet, the layer 2 data start at byte 0, L2 VLAN data start at byte 12, layer 3 IP data start at byte 14, and layer 4 data start at byte 34. The parser outputs may also indicate the location of some subsections. For instance, in the example of FIG. 3, the parser outputs may indicate that in the layer 4 data, GRE header, GRE Checksum, and GRE call data respectively start at bytes 34, 38, and 42. In some embodiments, the parser outputs also include flags indicating that one or more of these sections are present in the parsed packet.

The second stage shows that the first tag mask generator, tag mask generator 0, stores a base tag mask to select the L2 VLAN section of parsed packets. The second stage further shows that tag mask generator 0 uses information in the parser outputs to generate tag mask 0. In particular, tag mask generator 0 shifts its base tag mask to the location of L2 VLAN in the packet, that is, to start at byte 12.

The third stage, on the other hand, shows that the second tag mask generator, tag mask generator 2, stores a base tag mask to select the GRE call identifier section of the GRE data of parsed packets. The third stage also shows that tag mask generator 2 uses information in the parser outputs to generate tag mask 2. In particular, tag mask generator 2 shifts its base tag mask to the location of the GRE call identifier subsection of the layer 4 in the packet, that is, to start at byte 42. In various embodiments, the tag generation system may include other tag mask generators for generating other tag masks.

The fourth stage shows that the tag mask combiner combines tag mask 0 and tag mask 2 to generate the combined tag mask. In particular, in FIG. 3, the tag mask combiner combines these two bask masks by applying an OR gate. The combined tag mask, thus, includes bytes that select from the packet data the L2 VLAN data at bytes 12 and 13, and the GRE call data at bytes 42-45.

The fifth stage shows the packet data at the top row and the masked packet data at the bottom row. The top row shows some demonstrative values that the packet contains at different locations. In particular, the packet includes values A and B at L2 VLAN locations (bytes 12 and 13) and further includes values C, D, E, and F at GRE call ID locations (bytes 42-45). The top row also shows the packet values at other locations.

The bottom row of the fifth stage, on the other hand, shows the values of the bytes in the masked packet. Specifically, the masked packet includes values A, B, C, D, E, and F respectively at bytes 12, 13, 42, 43, 44, and 45; and values 0 at other bytes. The masked packet thus includes the values of the packet at locations enabled by the combined masked packet, and zero values elsewhere. The tag mask combiner may generate the masked packet at the bottom row by applying an AND gate between the packet data at the top row with the combined tag mask at the bottom row.

The fifth stage shows that the CRC receives the masked packet data and generates a tag for the packet. In this case, the tag may include the CRC16 reduction of the masked packet. The scheduling unit may use this tag to schedule the queuing or processing of the packet.

Based on the above structures and methods, various embodiments achieve high speeds and flexibility in packet scheduling. Different embodiments implement the tag generation system via software modules, via hardware modules, or via a combination of software and hardware modules. In some embodiments, the combination of the utilized hardware modules has a size that is smaller than the previously used hardware processors. In some embodiments, the processing unit is more than thirty times smaller than previously used processors. Further, some embodiments achieve very high data rates. For example, some embodiments can process over 100 M packets/s. Moreover, due to their architecture, some embodiments can be updated to adapt to new or evolved packet formats by using new microcode programs and without updating the hardware.

In various embodiments, one or more of modules disclosed in this disclosure are implemented via one or more software programs for performing the functionality of the corresponding modules or via processors executing those software programs. In some embodiments, one or more of the disclosed modules are implemented via one or more hardware modules executing firmware for performing the functionality of the corresponding modules. In various embodiments, one or more of the disclosed modules include storage media for storing data used by the module, or software or firmware programs executed by the module. In various embodiments, one or more of the disclosed modules or disclosed storage media are internal or external to the disclosed systems. In some embodiments, the disclosed storage media for storing information include non-transitory processor-readable media, such as data storage, e.g., a hard disk, or a flash memory, or other types of memory readable by processors or microprocessors. Further, in various embodiments, one or more of the storage media are non-transitory processor-readable or computer-readable media that store information or software programs executed by various modules or implementing various methods or flow charts disclosed herein.

The foregoing description of the invention, along with its associated embodiments, has been presented for purposes of illustration only. It is not exhaustive and does not limit the invention to the precise form disclosed. Those skilled in the art will appreciate from the foregoing description that modifications and variations are possible in light of the above teachings or may be acquired from practicing the invention. For example, the steps described need not be performed in the same sequence discussed or with the same degree of separation. Likewise various steps may be omitted, repeated, or combined, as necessary, to achieve the same or similar objectives. Similarly, the systems described need not necessarily include all parts described in the embodiments, and may also include other parts not described in the embodiments. Accordingly, the invention is not limited to the above-described embodiments, but instead is defined by the appended claims in light of their full scope of equivalents.

The invention claimed is:

1. A tag mask generation method comprising:
    receiving a section_selector flag indicating whether a tag mask comprising arbitrary number of bits for at least one section of a network packet is to be generated;
    receiving from a parser a parse information for the network packet, wherein the parse information includes a section_pointer that indicates a location of the section in the network packet;
    generating a pointer based on the section_pointer when the section_selector indicates that the tag mask for the section is to be generated;

receiving a base mask for the section; and generating the tag mask via a shifter by shifting the base mask by the amount indicated by the pointer.

2. The method of claim 1, wherein the parse information further includes a section_pointer_valid flag indicating whether the section is included in the network packet, and wherein the method further comprises including the tag mask in a combined tag mask when the section_pointer_valid flag indicates that the section is included in the network packet.

3. The method of claim 2, wherein including the tag mask in the combined tag mask includes combining the tag mask with the section_pointer_valid flag via an AND gate and including the result to the combined tag mask.

4. The method of claim 1, further comprising applying the tag mask to the network packet to derive a masked packet.

5. The method of claim 4, wherein the tag mask is applied to the network packet via an AND gate.

6. The method of claim 4, further comprising reducing the masked packet to derive a tag for the network packet.

7. The method of claim 6, further comprising scheduling queuing or processing of the packet based on the tag.

8. The method of claim 1, wherein the section is a first section of the network packet and the tag mask is a first tag mask corresponding to the first section, the method further comprising:

generating a second tag mask corresponding to a second section of the network packet; and combining the first tag mask and the second tag mask to generate a combined tag mask.

9. The method of claim 8, wherein the first tag mask and the second tag mask are combined via an OR gate.

10. The method of claim 8, further comprising applying the combined tag mask to the network packet to derive a masked packet.

11. The method of claim 10, further comprising reducing the masked packet to derive a tag for the network packet.

12. The method of claim 11, further comprising scheduling queuing or processing of the packet based on the tag.

13. A tag mask generation system comprising:

a selector module configured to generate a section_selector flag indicating whether a tag mask comprising arbitrary number of bits for at least one network packet is to be generated;

a multiplexer configured to receive the section_selector and a parse information for the network packet, wherein the parse information includes a section_pointer that indicates a location of the section in the network packet, and further configured to generate a pointer based on the section_pointer when the section_selector indicates that the tag mask for the section is to be generated;

a shifter module configured to receive the pointer and a base mask for the section, and further configured to generate the tag mask by shifting the base mask by the amount indicated by the pointer.

14. The system of claim 13, wherein the parse information further includes a section_pointer_valid flag indicating whether the section is included in the network packet, and wherein the system further comprises a combiner that is configured to include the tag mask in a combined tag mask when the section_pointer_valid flag indicates that the section is included in the network packet.

15. The system of claim 14, wherein including the tag mask in the combined tag mask includes combining the tag mask with the section_pointer_valid flag via an AND gate and including the result to the combined tag mask.

16. The system of claim 13 further comprising a masked packet generator module configured to apply the tag mask to the network packet to derive a masked packet.

17. The system of claim 16, further comprising a reducer module configured to reduce the masked packet to derive a tag for the network packet.

18. The system of claim 17, further comprising a scheduling unit configured to schedule queuing or processing of the packet based on the tag.

19. The system of claim 13, wherein the section is a first section of the network packet and the tag mask is a first tag mask corresponding to the first section and generated by a first tag mask generator, the system further comprising:

a second tag mask generator configured to generate a second tag mask corresponding to a second section of the network packet; and a combiner module configured to combine the first tag mask and the second tag mask to generate a combined tag mask.

20. The system of claim 19, further comprising a masked packet generator configured to apply the combined tag mask to the network packet to derive a masked packet.

21. The system of claim 20, further comprising a reducer module configured to reduce the masked packet to derive a tag for the network packet.

22. The system of claim 21, further comprising a scheduling unit configured to schedule queuing or processing of the packet based on the tag.

23. A non-transitory computer readable medium storing a computer program that, when executed by a tag generation system, causes the tag generation system to perform a tag mask generation method, the tag generation method comprising:

receiving a section_selector flag indicating whether a tag mask comprising arbitrary number of bits for at least one section of a network packet is to be generated;

receiving from a parser a parse information for the network packet, wherein the parse information includes a section_pointer that indicates a location of the section in the network packet;

generating a pointer based on the section_pointer when the section_selector indicates that the tag mask for the section is to be generated;

receiving a base mask for the section; and generating the tag mask via a shifter by shifting the base mask by the amount indicated by the pointer.

* * * * *